CURVE FOR USE WITH VAPOR PRESSURE DEVICE
FOR MEASURING THE VOLUMETRIC PERCENT OF
AIR IN SULFUR HEXAFLUORIDE

Nov. 2, 1965     T. O. PRUNTY ETAL     3,214,962
GAS-ANALYZER DEVICE
Filed April 28, 1961     6 Sheets-Sheet 4
Fig.5.     PRESSURE VS. TEMPERATURE OF SULFUR HEXAFLUORIDE AT CONSTANT VOLUME (UNITS PSIG, °F, CUBIC FEET PER LB.)
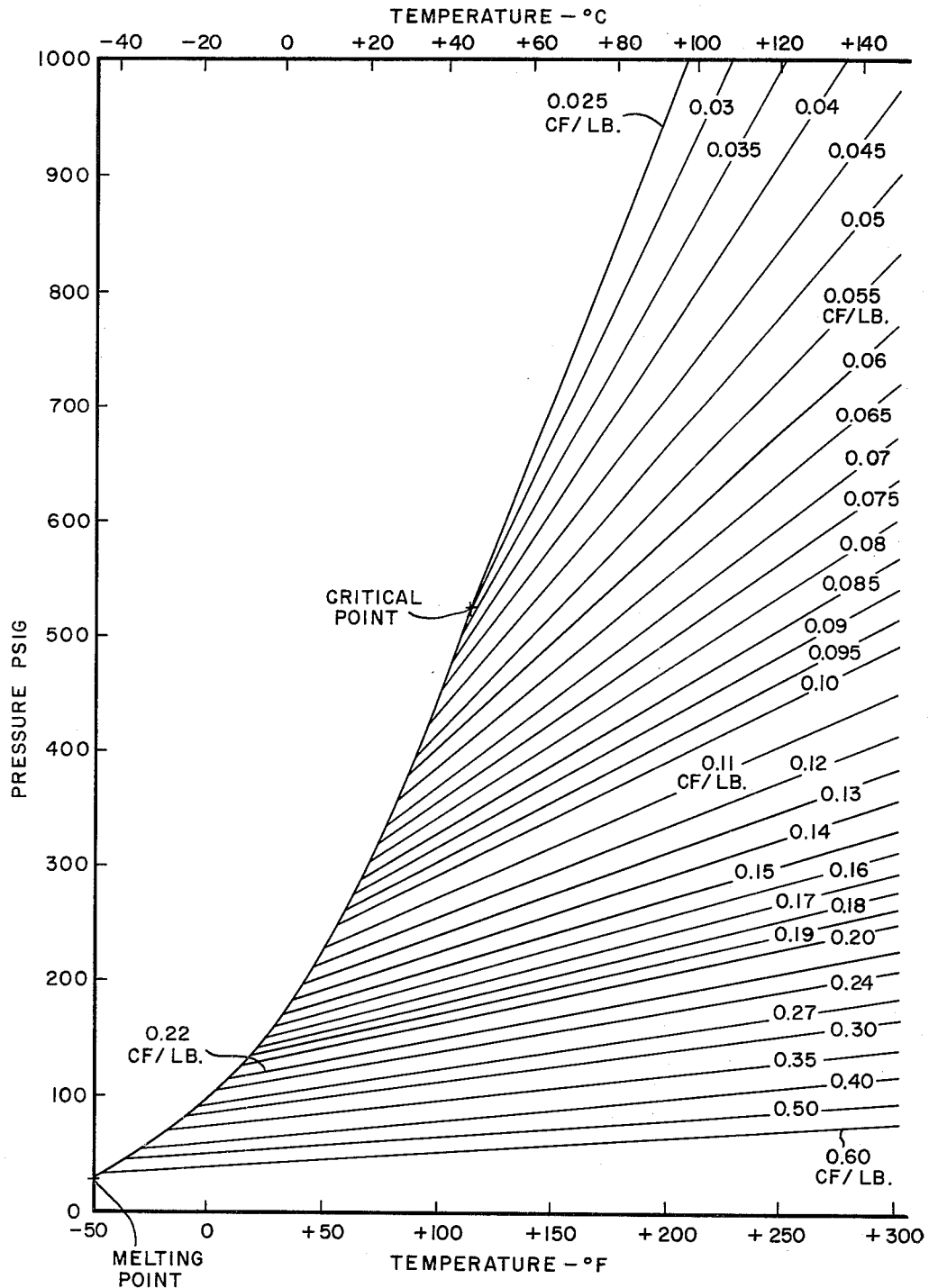

Nov. 2, 1965     T. O. PRUNTY ETAL     3,214,962
GAS-ANALYZER DEVICE

Filed April 28, 1961     6 Sheets-Sheet 6

$V_1 = V_s$ $V_1 = V_s$    $V_a$    $+$    $V_2 = V_g$    $V_b$

United States Patent Office 3,214,962
Patented Nov. 2, 1965

1

3,214,962
GAS-ANALYZER DEVICE
Thomas O. Prunty, Monroeville, Charles F. Cromer, Levelgreen, and Albert P. Strom, Forest Hills, Pa., assignors to Westinghouse Electric Corporation, East Pittsburgh, Pa., a corporation of Pennsylvania
Filed Apr. 28, 1961, Ser. No. 106,328
2 Claims. (Cl. 73—23)

This invention relates to gas-analyzing devices in general, and more particularly, to a portable easily-handled gas-analyzing device adaptable for field use and suitable for measuring the purity content of a desired gas.

The general object of the present invention is to provide an improved portable laboratory device which is of rugged construction and adaptable for field use, in which the amount of contaminating gas contained in a gas sample to be analyzed can quickly be determined in a minimum amount of time.

The present invention is adaptable for use with many different types of gases, the only qualification being that the contaminating gas and the test gas have substantially different vapor-pressure characteristics with the contaminating gas having a higher vapor-pressure characteristic at the test temperature.

Generally, the analyzing device of the present invention comprises a pair of chambers, one of which has a fixed volume, and the other of which has a variable volume. A specimen of the pure gas is introduced into the fixed volume in both the gaseous and liquid phases. A quantity, or a test sample, of the gas to be analyzed is introduced into the variable volume, and is compressed within the variable volume until the point of liquefaction of the sampled gas is obtained. By measuring the differential pressure between the pure gas and the gas to be analyzed, the relative amount of contaminating gas may be quickly obtained.

In certain interrupting apparatus of the type using a highly-efficient arc-extinguishing medium, such as sulfur-hexafluoride ($SF_6$) gas, it is desirable, periodically, to know the amount of air content, which has been introduced into the extinguishing gas through leakage and maintenance operations. Should the amount of air in the extinguishing gas be greater than a predetermined amount, the operability of the device may be in jeopardy. It is, therefore, essential that periodically the purity of the arc-extinguishing gas, such as sulfur-hexafluoride gas, be determined. On the other hand, the ultimate user, for example a public utility, may not want to be confronted with a problem of using a delicate laboratory device necessitating skilled operators. It would be extremely desirable, from their standpoint, to have available a rugged and portable type of device, which may be operated by unskilled personnel, and which will quickly and accurately determine the amount of air contained in the sulfur-hexafluoride extinguishing gas. By so knowing this information, the public utility will know whether the circuit-interrupting apparatus, or other switch-gear involving such sulfur-hexafluoride gas, is suitable for its normal rated operation.

By illustrating the present invention as applied particularly to switchgear apparatus utilizing sulfur-hexafluoride gas, it is not to be construed that the invention is solely confined to this use. The present invention has wide applications, and can analyze various gases, provided merely the contaminating gas and the test gas have appreciably different points of liquefaction, the contaminating gas having a higher point of liquefaction.

Further objects and advantages will readily become more apparent upon reading the following specification, taken in conjunction with the drawings, in which:

2

FIGS. 5 and 5A are graphs of pressure versus temperature of sulfur-hexafluoride gas at constant specific volume;

Figures 6, 7, 8:
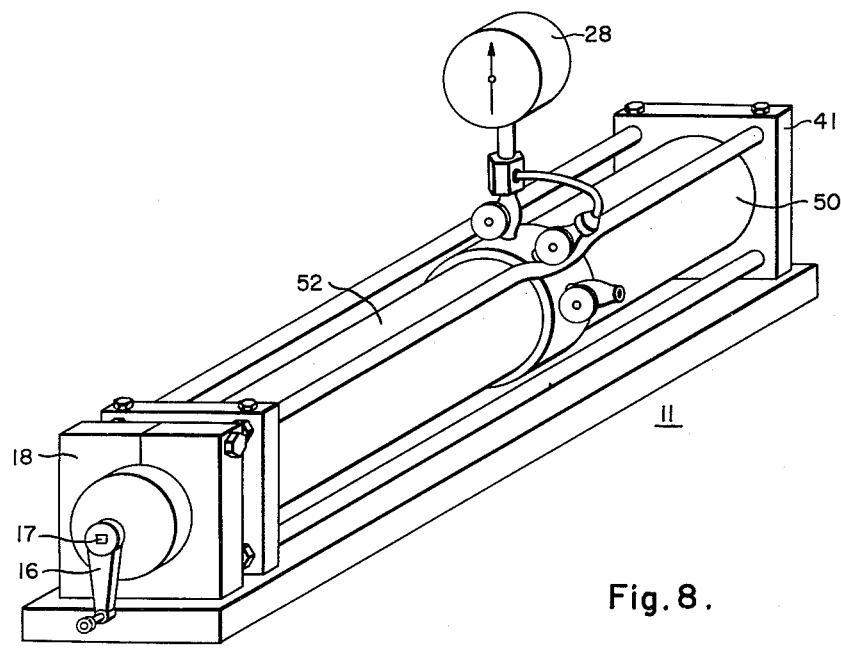

FIGS. 6 and 7 indicate volumes of gases used during predetermined air —$SF_6$ gas samples; and, FIG. 8 illustrates in perspective the gas-analyzing equipment of the invention.

Figure 1:
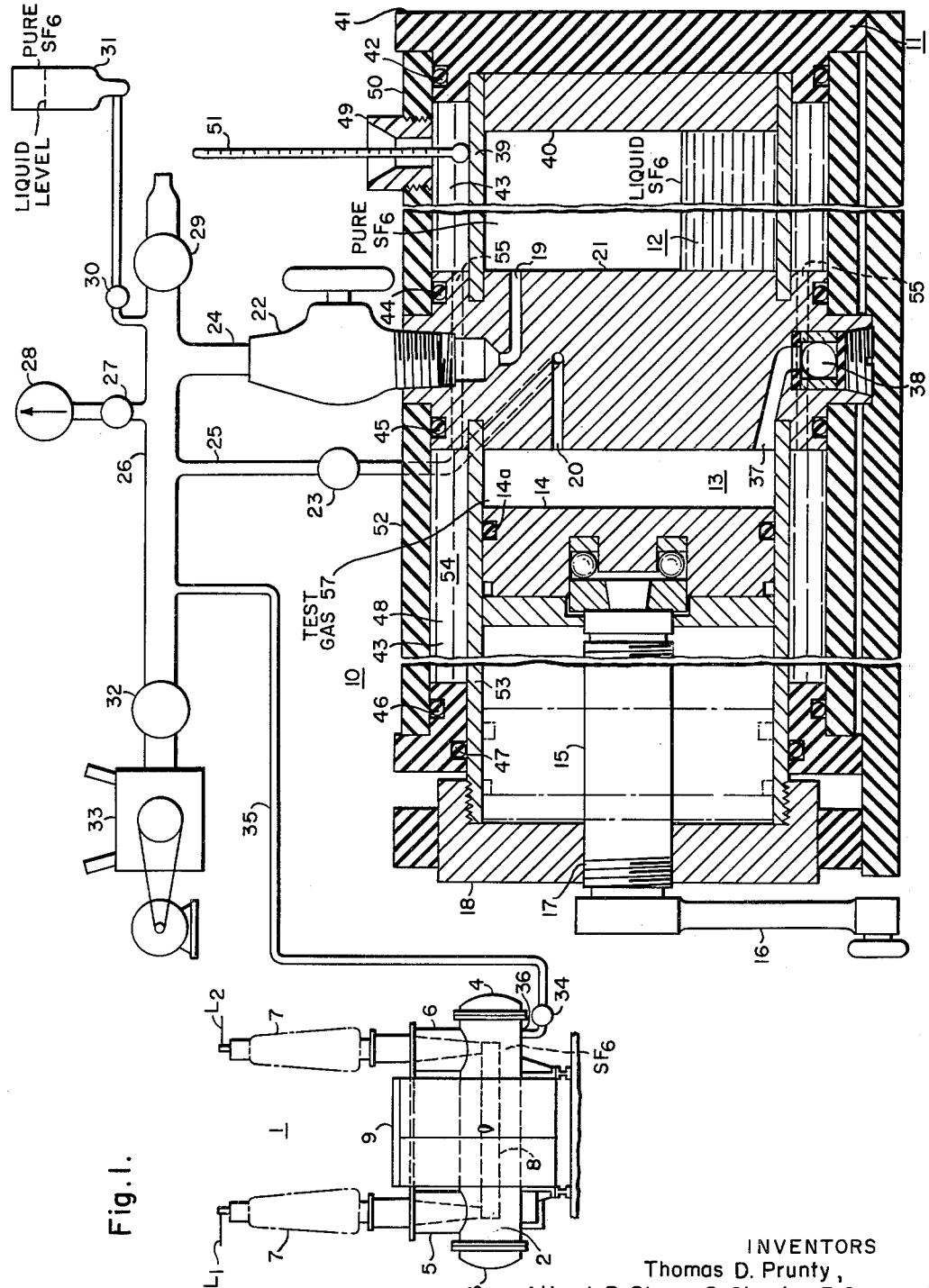
FIGURE 1 is a somewhat diagrammatic view illustrating an application of the gas-analyzing device of the present invention, as applied to determining the air content within the sulfur-hexafluoride gas used within a high-power circuit-interrupting structure.

In United States patent application filed January 23, 1959, Serial No. 788,668, now United States Patent 3,057,983, issued October 9, 1962 to Russell N. Yeckley, Joseph Sucha and Benjamin P. Baker, and assigned to the assignee of the instant application, there is illustrated and described a high-power circuit-interupting structure using sulfur-hexafluoride ($SF_6$) gas as the arc-extinguishing medium. An end view of such a type of device 1 is illustrated in FIG. 1. Although only one tank structure is shown in the end view of FIG. 1, actually for three-phase operation a plurality of spaced tanks 2 are associated with the circuit-interrupting structure 1, and the several tanks 2 have disposed at the outer ends thereof hinged covers 3, 4. Upstanding mounting supports 5, 6 support terminal bushings 7, which serve to carry the current from the connected line circuit $L_1$, $L_2$ to the interrupter 1.

Disposed interiorly within each tank structure 2, and supported from the lower interior ends of the terminal bushings 7, associated with that particular tank 2, is an arc-extinguishing assemblage 8 which serves to interrupt the connected circuit within the tank 2. A mechanism housing 9 encloses a suitable operating mechanism, which is linked to the contact structures of the several arc-extinguishing assemblages 8 disposed within the spaced tank structures 2. Reference may be had to the aforesaid patent application for a detailed and minute description of the operation of the circuit-interrupting assemblage 1. For the purpose of understanding the present invention, however, it is merely necessary to know that pure sulfur-hexafluoride ($SF_6$) gas is employed as the arc-extinguishing medium within the tank structures 2, and should there occur, by diffusion, or through maintenance operations, the entrance of too much air admixed with the sulfur-hexafluoride ($SF_6$) gas, the operability of the circuit-interrupting structure 1 would be in jeopardy. In other words, for successful operation of the circuit interrupter 1, it is necessary that the $SF_6$ gas be maintained at a desired purity concentration, and too much air admitted into the gas adversely affects its dielectric and interrupting properties as well as creating an atmosphere for corrosion to proceed. It is, therefore, necessary to know periodically the extent of air contamination of the $SF_6$ gas to be assured of continued reliable operability of the circuit-interrupting structure 1.

In addition to the desirability of determining the air content within the sulfur-hexafluoride ($SF_6$) gas employed within the switchgear apparatus 1, it is also desirable to have a portable and rugged device adaptable for field use, and which can be operated in a relatively short time. Moreover, it is advantageous to have such a gas-analyzing device suitable for operation by unskilled personnel. FIG. 8 is a perspective view of the gas analyzer of the present invention. The gas-analyzing device 10, includes a supporting frame-fork 11, which houses two chambers 12, 13. With reference to FIG. 1 of the drawings, the chamber 12 is of fixed volume and is gas-tight. The chamber 13, on the other hand, although gas-tight is variable in volume, the volume being determined by the movement of a piston 14 moved by a threaded rod 15, which is rotated by an externally-disposed crank-arm 16. Thus, manual rotation of the externally-disposed crank-arm 16 will effect rotation of the threaded rod 15, and, because of the threaded connection at 17 to end plate 18, the piston 14 will move linearly inwardly or outwardly to correspondingly decrease or expand the volume of variable chamber 13.

Relatively small passages 19, 20 are provided within an intermediately-disposed metallic block 21, preferably made of an easily machinable material, such as brass, to permit gases to be introduced into the chambers 12, 13. The duct 19 is controlled by a needle valve 22, and the passageway 20 is similarly controlled by a needle valve 23. The needle valves 22, 23 are respectively connected by pipes 24, 25 to a branch connection 26, which leads through a needle valve 27 to a pressure gauge 28. In addition, the branch connection 26 leads, by way of a valve 29, to atmosphere, and through another valve 30 to a tank, or cylinder 31 of pure $SF_6$ in the liquid and gaseous phases, as shown in FIG. 1.

As shown in FIG. 1, the branch connection 26 moreover leads, through a valve 32, to a vacuum pump 33, and also through an additional valve 34 and a pipe line 35 to the tank structures 2 of circuit interrupter 1. Obviously, the connection 36 at the tank structure 2 may be removed when it is desired to employ the gas-analyzing device 10 at other locations, or, if desired, the analyzing device 10 may be permanently connected to the tank 2 of the circuit-interrupting device 1.

With further reference to the gas-analyzing device 10, it will be noted that an additional passageway 37 is associated with the metallic block 21, and leads into a sight glass 38, where the liquefaction of the test sample may be externally viewed through a lateral peep hole drilled in the block 21. The fixed volume 12 is, in part, defined by a metallic tube 39 and an end block 40. A cover block 41 is provided to support fixed volume 12 and help form a water tight annular chamber 43. The annular chamber is, in part, defined by a tube 50, preferably of a transparent material, and the aforementioned tube 39. Tubes 52 and 53 define, in part, a similar annular water chamber 54 which is connected to the annular water chamber 43 by a number of drilled holes 55 in the metallic block 21. Gaskets 42, 44–47, insure that the water 48, which is disposed within the annular volumes 43 and 54 will not leak out of the analyzing device 10. The water bath 48 insures that the temperatures of the chambers 12, 13 will be at the same value.

A filling plug 49 may be associated with the outer tube 50, and a thermometer 51 may be employed to measure the temperature within the water bath 48.

As mentioned hereinbefore, it is necessary periodically for the user of sulfur-hexafluoride ($SF_6$) apparatus to determine if impurities, such as air, have been introduced into the $SF_6$ gas. This is especially true for the user of $SF_6$ switchgear, where the presence of air in the apparatus may impair the reliable operation of the device.

Gaseous impurities may be identified and quantitatively analyzed by mass spectrographic analysis of a gas sample. The volumetric percentage of gaseous impurities may be determined from "gas density balance" measurements, or by weighing a known volume of sampled gas at a known temperature and pressure.

It is reasonable to assume that the user of $SF_6$ gas is only interested in determining the approximate percentage of gaseous impurities during periodic inspections. He does not need to know what the impurities are, unless the quantity present is excessive. Further, we can assume that he will want his analyzing equipment ruggedly constructed, simple to operate, portable and able to give the desired information quickly. Since the above-mentioned mass spectrometer, gas density balance, and weighing devices are all delicate laboratory instruments, requiring skilled operators, there is need for the device 10 described in the present invention. This device makes use of the principle that the total pressure of a condensing gas is the sum of its normal vapor pressure plus the partial vapor pressure of any other gas occupying the same volume. In other words, it utilizes the law of partial pressures.

The gas-analyzing device 10 consists of the two cylindrical chambers 12, 13 both of which are gas-tight. The volume of the chamber 13 can be varied through the motion of the piston 14, which can be moved through the operation of the screw and crank 15 and 16. The piston 14 is shown in a forward position, but can be retracted to the position shown by the dotted lines. The pressure gauge 28 can be connected to either chamber 12 or chamber 13 by the suitable positioning of the valves. The two chambers 12, 13 are immersed within a water bath 48, comprising the annular volume 43. The water bath 48 maintains the device at a constant temperature while pressure gauge readings are being taken. The temperature of the bath 48, and therefore of the system, can be read on the thermometer 51. Variable chamber 13 contains sampled $SF_6$ gas which, when compressed to the proper pressure, will begin to liquefy. Any liquid, thus produced, will be visible in the sight glass 38 by way of the lateral peep holes in block 21.

The device 10 is operated in the following manner: With valves 23, 29, 30 and 34 closed, the chamber 12 is first evacuated through opened valves 32 and 22 and vacuum pump 33. Valve 32 is closed when the evacuation is completed. Chamber 12 is then filled, through opened valves 22 and 30 with pure liquid $SF_6$ from the inverted cylinder 31 to a liquid level preferably not exceeding 40% of the volume of the chamber 12. The exact liquid level within this limit is of little importance as long as some liquid $SF_6$ is present in chamber 12 at the bath temperature. Now valve 22 is closed after this operation. The above procedure can be done at the time the device 10 is constructed, and should not be construed as being part of the time required to run a gas analysis. The quantity of $SF_6$ in chamber 12 should be sufficient for an indefinite number of gas analyses, if no leakage is sustained from fixed-volume chamber 12. With the piston 14 in the position shown in dotted lines in FIG. 1, the variable-volume chamber 13 is evacuated through open valves 23, 32, with valves 34, 29, 22 and 30 closed. Leakage past piston 14 is prevented by the "O" ring seal 14a. Valve 27 is also opened to remove air from the connecting piping and gauge 28. When the evacuation is complete, the valves 32, 23 are closed, and valve 22 is opened. The pressure in chamber 12 is recorded along with the temperature of the water 48. After these readings are taken, the valve 22 is closed and the valve 32 is opened. The piping and the valves are again evacuated through open valve 32. Valve 32 is again closed when evacuation is complete. The sampled gas is next admitted into chamber 13 through open valves 34 and 23. When the filling is complete, the valve 34 is closed. Now with valves 23 and 27 open and valves 34, 32, 29 and 22 closed, the piston 14 is moved forward by turning on the crank-arm 16, thus raising the pressure within chamber 13. The piston 14 is moved forward until the pressure in chamber 13 is just sufficient to begin liquefying the $SF_6$ gas. The presence of liquid $SF_6$ is noted visually through the sight glass 38. When the liquid first appears, the forward motion of piston 14 is stopped. The device 10 is allowed time to come to temperature equilibrium. By further fine adjustment of the crank 16 and observance of the liquid in the sight glass 38, the piston 14 can be so positioned that the point at which liquefaction of the test gas 57 begins can be determined accurately. A temperature and pressure reading is again taken.

Since the device 10 is operated in a water bath 48, the two temperature readings will be the same. It has been shown by calculations based upon the law of partial pressures, and specific volume-pressure-temperature characteristics of $SF_6$ that the volumetric percentage of gaseous impurities at one atmosphere of pressure is a function of the difference between the two pressure readings taken and the measured temperature. The relationship is shown graphically in FIG. 2.

Figure 5A:
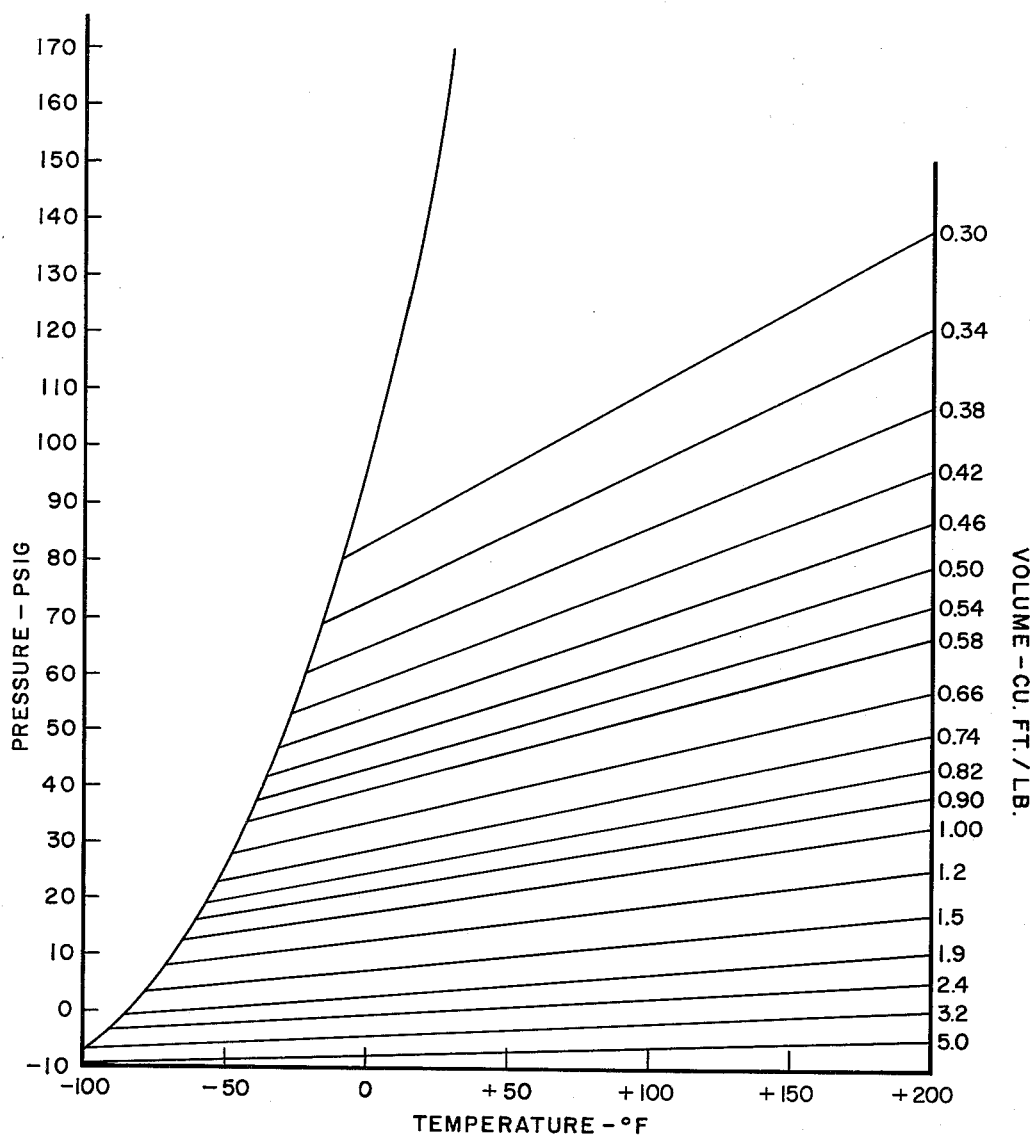

The formula is as follows:

$$\Delta P = \frac{V_g}{V_s} \left( \frac{14.7}{\frac{100}{\text{per cent air}} - 1} \right)$$

where $\Delta P$ is the difference in gauge pressure readings in p.s.i., $V_s$ is the specific volume of pure saturated $SF_6$ at the temperature and $V_g$ is the specific volume of pure $SF_6$ at one atmosphere of pressure and the temperature. $V_s$ and $V_g$ can be read from pressure-temperature curves published by General Chemical in Technical Bulletin TB–85602 and in an earlier publication of this bulletin. These curves are presented in FIG. 5 and FIG. 5A.

The derivation of the above equation is fully shown as follows: Suppose we have a volume $V_1$ which contains air (or any perfect gas) at 1 atmosphere of pressure and temperature $T_1$ as shown in FIG. 6. We now introduce pure $SF_6$ into the volume and raise the pressure until the $SF_6$ is a saturated vapor at $T_1$ with a specific volume of $v_s$ cu. ft./lb. For convenience set $V_1$ numerically equal to $v_s$. Next we expand volume $V_1$ until the total pressure inside is again one atmosphere at $T_1$. We now divide the new volume into two imaginary volumes $V_a$ and $V_b$, one containing all the air at one atmosphere and $T_1$ and the other containing all the $SF_6$ at one atmosphere and $T_1$ as shown in FIG. 7. The imaginary chamber $V_a$ containing air at one atmosphere obviously has a volume numerically equal to $v_s$. The remaining volume $V_b$ contains all the $SF_6$ at a specific volume $v_g$. When we previously set $V_1$ numerically equal to $v_s$ above, we have said in disguise that we have added one pound of $SF_6$ to volume $V_1$. Since the remaining expanded volume $V_b$ contains all the $SF_6$ (1 lb.) then $v_g$ is also numerically equal to the volume $V_b$. Now by definition, from FIG. 7, the percent air by volume in the gas mixture at one atmosphere is $$\text{Percent air} = \frac{V_a(100)}{V_a + V_b} = \frac{v_s(100)}{v_s + v_g}$$

where the volume units are consistent. Had the original volume $V_1$ contained air at any pressure $Pa$, other than atmospheric, then $V_a$ would have to be corrected to atmospheric pressure by multiplying by the ratio $Pa/14.7$ where $Pa$ is in pounds per square inch absolute. Thus, the percent air is given by the relation $$\text{Per cent air} = \frac{V_a \frac{Pa}{14.7}(100)}{V_a \frac{Pa}{14.7} + V_b} = \frac{v_s \frac{Pa}{14.7}(100)}{v_s \frac{Pa}{14.7} + v_g}$$

Note that in accordance with the law of partial pressures, $Pa$ is equal to the difference in pressure ($\Delta P$) between pure and impure $SF_6$ as determined in this impurity measuring device 10. Substituting $\Delta P$ for $Pa$ and solving for $\Delta P$ we get $$\Delta P = \frac{v_g}{v_s} \frac{14.7}{\left( \frac{100}{\text{Percent air}} - 1 \right)}$$

where $\Delta P$ is in pounds per square inch and $v_g$ and $v_s$ are in consistent units. Both $v_g$ and $v_s$ can be read directly from $SF_6$ curves published in General Chemical Bulletin TB–85602. We read $v_g$ at the saturation line and the temperature and $v_g$ at 14.7 p.s.i.a. and the temperature. $v_g$ and $v_s$ can also be calculated (with much more difficulty) from the equations of state for $SF_6$ from which the pressure-specific volume-temperature curves that appear in General Chemical Bulletin TB–85602 (FIG. 5A) and the earlier publication (FIG. 5) were plotted.

Figure 2:
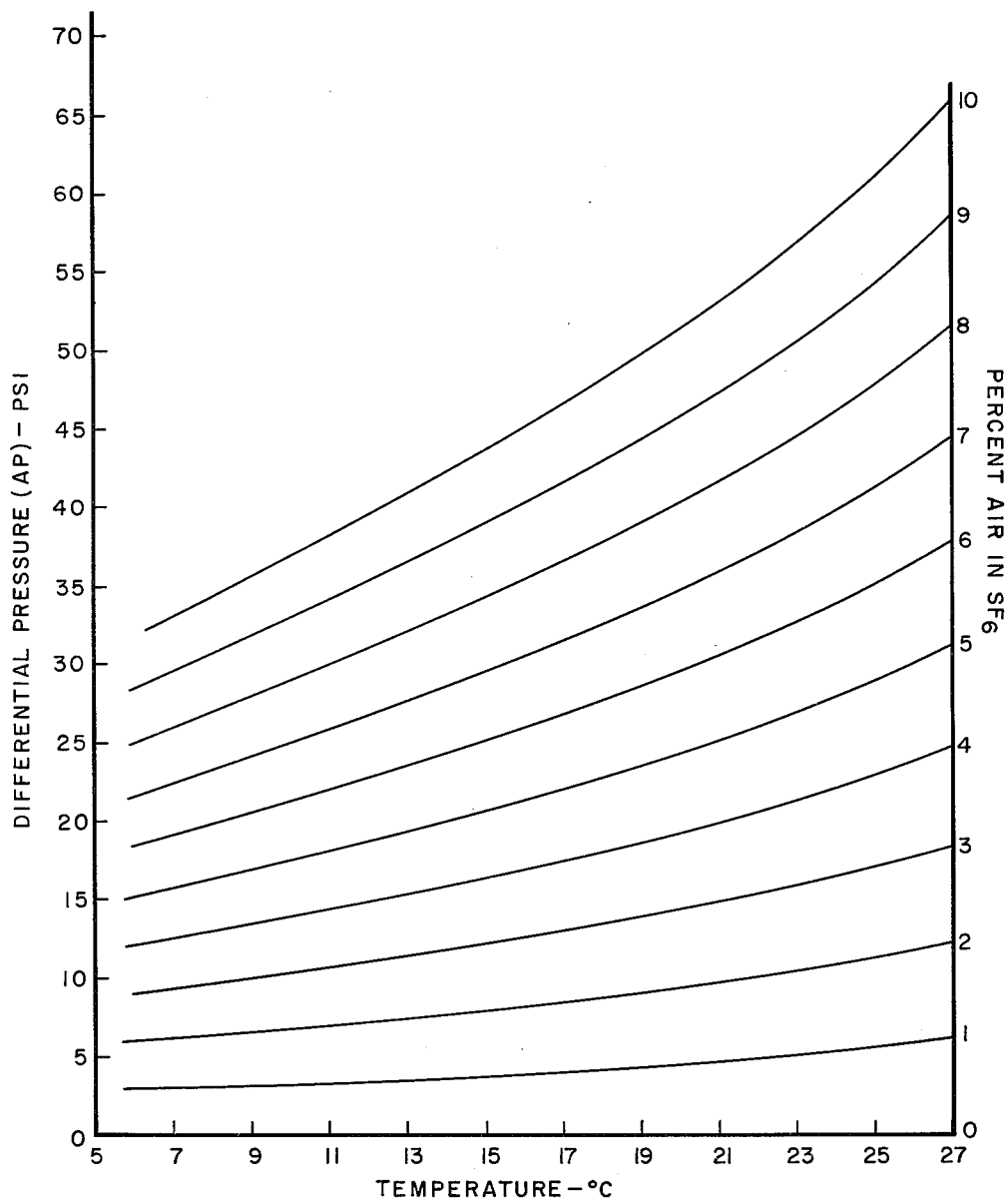
FIG. 2 is a graph of the differential pressure versus temperature, which is employed in determining the percent of air contaminant in the use of the device illustrated in FIG. 1.

For convenience, the above equation has been plotted with the pressure difference as ordinates and the temperature as the abscissa. This gives a family of curves for various percentages of air. FIG. 2 shows curves for zero to 10% air using the centigrade temperature scale.

Testing was done on the prototype at room temperature. A number of tests were run on samples containing 10%, 5% and about 1% air. These samples were prepared directly in the variable volume chamber 13 by adding pure $SF_6$ to the chamber 13 containing air at 1 atmosphere. Testing consisted of comparing experimental data to that predicted by the theoretical equation above.

*Summary of results*

| Test | Pressure Difference | | Percent Air | |
|---|---|---|---|---|
|  | Theoretical | Measured | Measured | Theoretical |
| 1 | 45 | 58 | 12 | 10 |
| 2 | 47 | 47 | 10 | 10 |
| 3 | 48 | 52 | 10.7 | 10 |
| 4 | 49 | 49 | 10 | 10 |
| 5 | 52 | 56 | 11 | 10 |
| 6 | 52 | 56 | 11 | 10 |
| 7 | 52 | 54 | 10.5 | 10 |
| 8 | 5 | 7 | 1.5 | 1.0 |
| 9 | 5 | 7 | 1.5 | 1.0 |
| 10 | 26 | 28 | 5.6 | 5 |
| 11 | 26 | 29 | 5.7 | 5 |
| 12 | 26 | 27 | 5.2 | 5 |

Examination of the data shows very close agreement between measured and theoretical quantities. The measured quantities are consistently higher than the theoretical. Since some liquid $SF_6$ must be produced to determine the saturation pressure the higher measured values can probably be attributed to this necessary over-compression. The theoretical equation does not account for the drops of liquid produced but a correction could be made.

From experience gained during test runs on the prototype a suggested procedure for operating the device 10 is to move the movable piston 14 forward until it bottoms on the metallic block 21. The gas to be analyzed is connected to the device by way of a short length of preferably small diameter tubing. The small clearance volume left in the variable volume chamber 13 plus the volume inside the gauge, piping and valves are then purged with the gas to be analyzed by filling and draining to the atmosphere. This procedure eliminates the need for a vacuum pump to remove the air in chamber 13. The piston 14 is then backed off about seven inches. Then the chamber 13 is simultaneously filled with the gas to be analyzed. The filling valve 34 is then closed. The piston 14 is cranked forward until the pressure is reached for saturation of pure $SF_6$ at that temperature. Several minutes wait is sufficient to establish thermal equilibrium. The pressure is then raised in five p.s.i. increments with 10 second time intervals inbetween pressure adjustments until the presence of liquid is first detected in the sight glass 38. The liquefying temperature and pressure are recorded. The piston 14 is then backed off until the pressure falls below the saturation pressure for pure $SF_6$ at the temperature. Valve 23 is then closed and valve 22 opened to admit pure $SF_6$ to the gauge and the pressure is noted and the percent of air is determined from the curves of FIG. 2. This answer should be accurate within ±1% of air. If greater accuracy is desired, the procedure may be repeated and the percentages averaged. Experience has shown that an analysis takes about 20 minutes.

Estimates have shown that if the connecting gas tubing is kept small, the total trapped air would add less than 1% air to the test gas. With proper design, it may be possible to make this quantity of trapped air small thus eliminating the purging operation before admitting the test gas.

It is to be noted that the pressure of pure $SF_6$ is known for any temperature, and the device 10 can thus be used for point checks for determining the accuracy of the pressure gauge 28 at the time it is used. Also, since both pressure readings are taken on the same gauge 28, and then only the pressure difference used, there is much less chance of gross error than if two pressure gauges were used.

Although the device 10 is described for measuring the air content in $SF_6$ gas it would work equally well with impurities other than air if it is known that the impurity gases are nearly perfect gases. This is an inherent advantage over the gas density balance and weighing methods of gas analysis.

The base gas is not restricted to $SF_6$ gas. The device will work for any gas where the condensation pressure is within a tolerable operating pressure and the impurity gases have a vapor pressure above that of the base gas. As examples of other gases which may be used there are $SeF_6$ (selenium hexafluoride) $C_3SF_8$ (perfluoropropane), refrigerants, such as $SO_2$ (sulfur dioxide), and various Freons.

Figure 3:
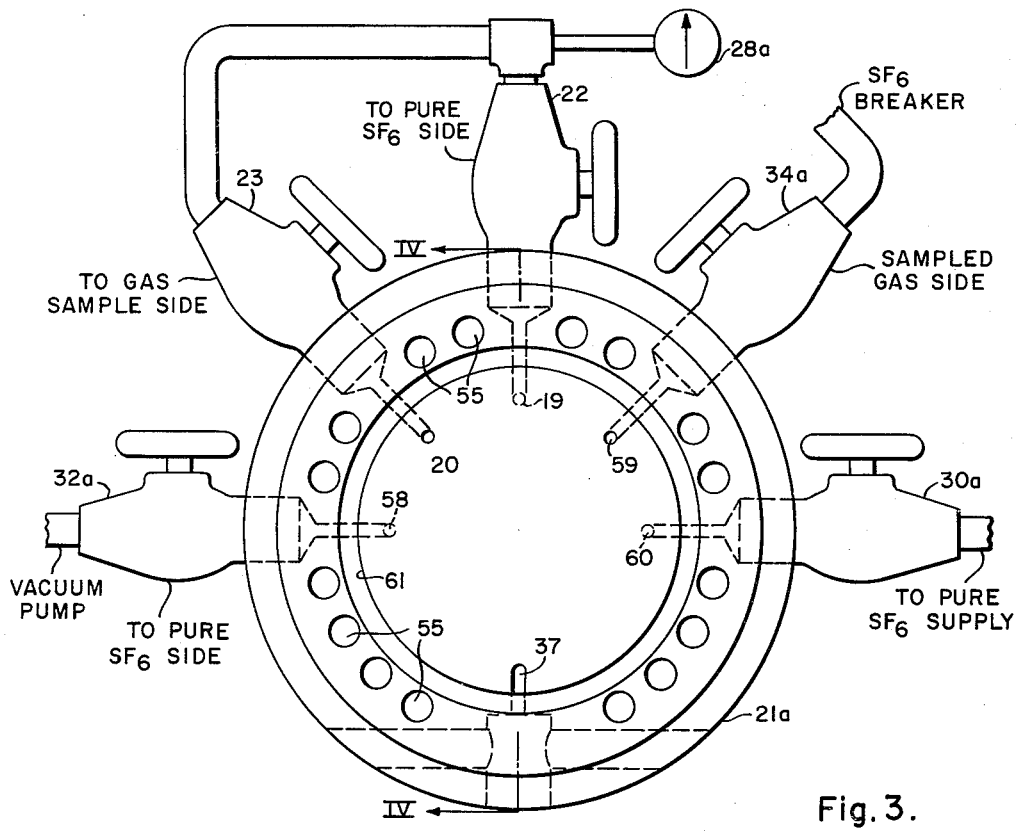
FIG. 3 is a vertical sectional view taken through a modified type of analyser different from the one illustrated in FIG. 1.

FIG. 3 shows a modified type of central gauge plug 21a in which the valve connections are disposed about the periphery of the plug. With such an arrangement there results the advantages of minimum piping and accurate control of the gas content of the chambers 12, 13.

Figure 4:
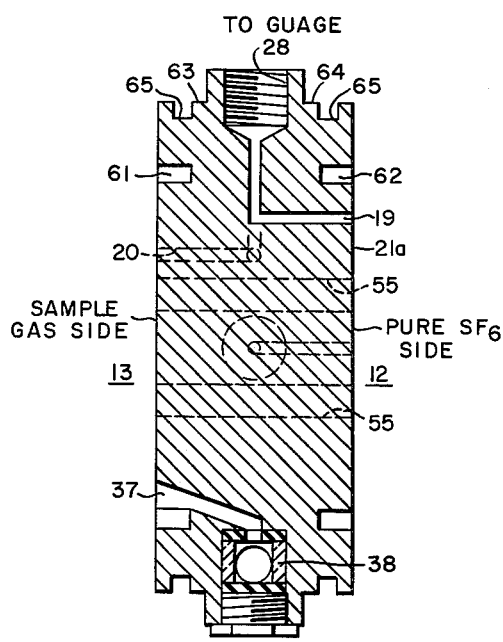
FIG. 4 is a sectional view taken substantially along the line IV—IV of FIG. 3.

In the modified valve block 21a of FIGS. 3 and 4, there are shown five needle valves, which may conveniently be arranged around the periphery of the valve block 21a. It will be noted that there is provided a needle valve 32a leading through a passage 58 to the pure $SF_6$ side of the analyzer. In addition, a needle valve 34a interconnects the $SF_6$ breaker tank by way of a passage 59 to the gas-sample side 13 of the valve block 21a. Also, a needle valve 30a is provided to interconnect the pure $SF_6$ bottle 31 by way of an inlet passage 60 to the pure gas side 12.

Annular mounting grooves 61, 62 assist in supporting the metallic tubes 53, 39 respectively. Shoulder portions 63, 64 support the transparent outer tubes 52, 50 respectively, with annular sealing grooves 65 for accommodating the O rings 44, 45.

The device 10, as described above, is readily constructed and may easily be carried by hand and takes little skill for an operator to record the temperatures and pressures to determine the volumetric percentage, as set forth in FIG. 2.

In the device 10, as described above, calculations have shown that with proper design, the air trapped in the piping can be almost negligible. Thus, the gas sample can be connected directly to the device 10 with the piston 14 fully forward in order that no evacuation be necessary. The sample is then introduced into chamber 13 through open valves 34, 23 by moving the piston 14 to its fully retracted position. More accuracy can be obtained by filling the small clearance volume and the piping with pure $SF_6$ from chamber 12, than from purging with the sample gas. Although the device described has been illustrated in connection with a gas analysis of $SF_6$ gas, as mentioned above, it can be used with other liquefiable gases, especially those with vapor pressures above one atmosphere.

From the foregoing, it is apparent that there is described an improved gas-analyzing device 10 suitable for determining the percentage of gaseous impurities by volume in $SF_6$ or other liquefiable gases. The instrument can be readily constructed for field use, made portable and can, most importantly, be operated by semi-skilled personnel.

Although there has been illustrated and described a specific gas-analyzing device, it is to be clearly understood that the same was merely for the purpose of illustration, and that changes and modifications may readily be made therein by those skilled in the art without departing from the spirit and scope of the invention.

We claim as our invention:

1. A gas-analyzing device including an elongated tube having a valve-control block intermediate the ends thereof, said elongated tube defining a first fixed volume on one side of said valve-control block and a second variable volume on the other side of said valve-control block having a transparent portion, constant temperature means for the volumes, piston means for reducing and expanding said second variable volume, means for introducing pure gas into said valve-control block and into said first fixed volume in both the liquid and gaseous phases, means for introducing a sample gas into said valve-control block and into said second variable volume, indicating means responsive to pressure in the fixed and variable volumes, means for moving said piston means toward said valve-control block to reduce the space within the second volume to the pressure at start of liquefaction, whereby the differential pressure of said first and second volumes at the same temperature may be noted for a determination of the percentage contaminant of the sampled gas.

2. A gas-analyzing device including an elongated tube having a valve-control block intermediate the ends thereof, said elongated tube defining a first fixed volume on one side of said valve-control block and a second variable volume on the other side of said valve-control block having a transparent portion, constant temperature means for the volumes, piston means for reducing and expanding said second variable volume, means for introducing pure gas into said valve-control block and into said first fixed volume in both the liquid and gaseous phases, means for introducing the sample gas into said valve-control block and into said second variable volume, indicating means responsive to pressure in the fixed and variable volumes, means including manually operable crank means for moving said piston means toward said valve-control block to reduce the space within the second volume to the pressure at start of liquefaction, whereby the differential pressure of said first and second volumes at the same temperature may be noted for a determination of the percentage contaminant of the sampled gas.

References Cited by the Examiner
UNITED STATES PATENTS

| | | | |
|---|---|---|---|
| 2,662,393 | 12/53 | Rzasa | 73—23 |
| 2,722,121 | 11/55 | Fisher | 73—23 |
| 2,866,339 | 12/58 | Rhodes et al. | 73—53 X |

RICHARD C. QUEISSER, *Primary Examiner.*

ROBERT L. EVANS, JOSEPH P. STRIZAK, *Examiners.*